Figures 1, 2:
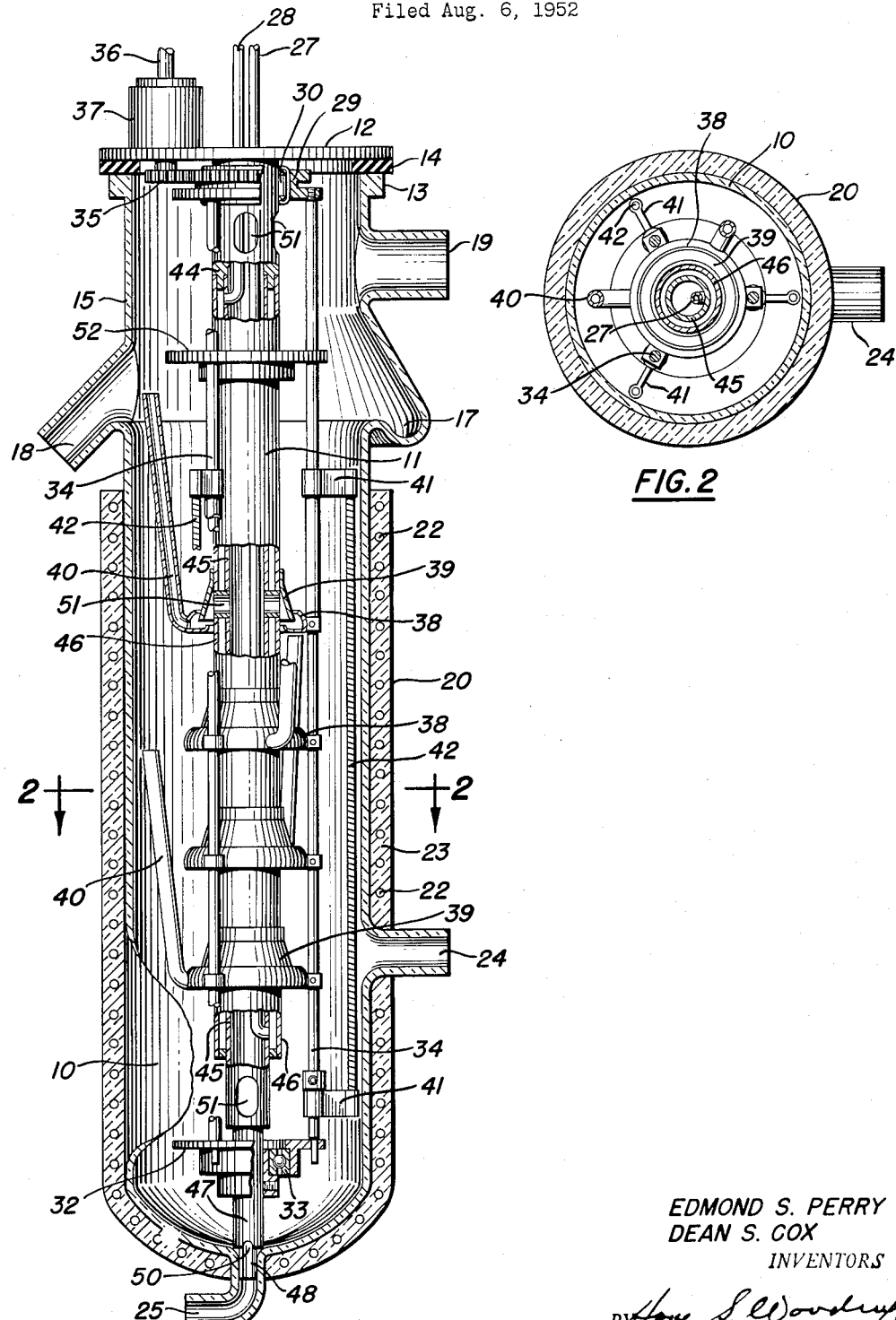

June 5, 1956 — E. S. PERRY ET AL — 2,749,292
VACUUM DISTILLATION APPARATUS
Filed Aug. 6, 1952

EDMOND S. PERRY
DEAN S. COX
INVENTORS

ATTORNEYS

United States Patent Office 2,749,292
Patented June 5, 1956

2,749,292

VACUUM DISTILLATION APPARATUS

Edmond S. Perry and Dean S. Cox, Rochester, N. Y., assignors to Eastman Kodak Company, Rochester, N. Y., a corporation of New Jersey Application August 6, 1952, Serial No. 302,874

3 Claims. (Cl. 202—205)

This invention relates to high vacuum fractional distillation apparatus.

In the separation of materials by vacuum distillation, it is often desirable to accomplish true fractionation rather than simple separation such as is obtained with a pot still or a flowing film still involving a single evaporation with complete condensation and withdrawal of the distillate. In atmospheric pressure or elevated pressure processes for separating thermally stable materials, bubble cap columns or packed columns are commonly employed to effect fractionation, i. e. separations greater than one theoretical plate. Thermally labile materials, however, must be distilled at reduced temperatures and hence reduced pressures to avoid objectionable thermal decomposition. The use of bubble cap columns or packed columns is impractical under high vacuum conditions because of the impedance to vapor flow and resultant excessive pressure drop between stages of the columns.

A column type vacuum fractionating still was developed by Hickman and is described in his copending application, Serial No. 533,796, filed May 2, 1944, now U. S. Patent No. 2,609,335. This still embodied a heated column having a rotatable cooled core extending downwardly therethrough and defining with the heated column a confined but unobstructed channel for the passage of vapors being fractionated. Vapors of distilland passing upwardly between the cooled core and the heated column were repeatedly condensed on the cooled core, centrifugally conveyed across the confined channel to the heated vaporizing surface and at least partially revaporized back into the vapor stream. The more volatile components of the condensate fractions were thus readily revaporized into the vapor stream and the less volatile components stripped out of the vapor stream by the repeated condensations and revaporizations.

The fractionating efficiency of the Hickman still was further enhanced by Perry and Mansing who disclosed, in U. S. Patent 2,539,699, the use of bristles secured to the cooled core and extending radially outward into sweeping contact with the vaporizing surface, the bristles serving to convey condensate from the cooled core to the heated vaporizing surface at a multiplicity of levels in the column and to spread the condensate in a thin film on the vaporizing surface and agitate the film for effective revaporization without obstructing the upward passage of vapors to any objectionable degree.

Taylor in U. S. Patent 2,562,153 discloses a column still of the Hickman type wherein the condensate fractions are collected at spaced intervals along the cooled core and thrown outwardly to the vaporizing surface at a point higher than the bottom of the zone from which the condensate was collected but not higher than the top of such zone.

It is an object of this invention to provide an improved high vacuum fractionating still.

It is another object of the invention to provide a high vacuum fractionating still of the column type having improved fractionating efficiency as compared to prior stills of this type.

It is a further object of this invention to provide a high vacuum still of the type employing a heated column and a cooled core and including improved means for conveying condensate from the cooled core to the heated column to obtain optimum fractionating power.

Another object of the invention is to provide a high vacuum fractionating still of new and improved construction.

Another object of the invention is to provide a high vacuum still of the type employing repeated condensations and revaporizations of the vapors of the material being fractionated and including means for effecting revaporization of condensate fractions in a different zone of the still than the zones from which the condensate fractions were collected.

Another object of the invention is to provide a vertical column type fractionating still wherein vapor fractions are condensed substantially throughout the length of the column and including new and improved means for progressively advancing the resulting condensate fractions up the column.

Another object of the invention is to provide a still wherein residue from a higher zone is mixed with condensate conveyed upwardly from a lower zone and each zone of the still thus operates as a complete countercurrent distillation unit operating under optimum conditions.

Other objects will be apparent from the drawings, description and claims.

These and other objects are attained by means of this invention, a preferred embodiment of the invention being illustrated in the drawings.

Of the drawings:

Fig. 1 is a view in elevation, partially broken away and in section, of a high vacuum fractionating still which constitutes a preferred embodiment of the invention; and Fig. 2 is a section taken along line 2—2 of Fig. 1.

The still embodying this invention, with particular reference to the preferred embodiment illustrated in the drawings, comprises a generally vertical tubular column 10 of glass, metal or similar material having a stationary tubular core 11 of metal or other suitable material mounted concentrically within column 10 and extending throughout the length of column 10. The lower end of column 10 is closed to form a pot-like bottom for the still, and the upwardly directed mouth of column 10, which permits access into the still, is closed by plate 12 which is clamped or otherwise secured to the flanged upper margin 13 of column 10. Gasket 14 of rubber or similar material sandwiched between plate 12 and flange 13 ensures a vacuum tight seal between column 10 and plate 12. The upper zone 15 of column 10 is unjacketed and forms an air cooled total condenser section. An annular gutter 17 extending around the lower margin of zone 15 serves as a collecting alembic and is provided with a withdrawal conduit 18. Evacuating port 19 opening out of column 10 adjacent the upper end of the column is adapted to be connected to a suitable vacuum pumping system (not shown) for evacuating the column.

The remainder of column 10 below the total condenser zone 15 is enclosed within a heating jacket 20 which desirably consists of a plurality of evenly spaced turns of resistance wire 22 embedded in a ceramic lagging 23, the heating jacket being provided with the usual binding posts (not shown) for current supply and outlet. An inlet conduit 24 for the introduction of material to be distilled opens into the heated portion of column 10 at a point spaced upwardly from the bottom of the column. A residue drain 25 for the withdrawal of undistilled residue opens out of the bottom of column 10.

Core 11, which is described more fully hereinafter, is cooled throughout most of its length by the circulation through core 11 of cooling water or other fluid which is introduced through inlet tube 27 and withdrawn through outlet tube 28. The upper end of core 11 is welded or otherwise secured to plate 12 which closes the mouth of column 10, and the lower end of core 11 seats in residue drain 25 to prevent lateral displacement of core 11.

A ring gear 29 is journalled on bearing 30 which in turn is mounted on core 11 immediately below plate 12 and adjacent the upper end of core 11. A rotatable annular plate 32 is similarly journalled on bearing 33 which is mounted on core 11 adjacent the lower end of core 11. Annular plate 32 and ring gear are rigidly connected by riser rods 34, 34 which extend parallel to core 11 and which are spaced from core 11. Ring gear 29 engages spur gear 35 keyed to motor shaft 36, and shaft 36 extends through plate 12 to a motor (not shown) whereby ring gear 29, annular plate 32 and riser rods 34, 34 are rotated as an integral assembly. A conventional rotary vacuum bearing housed in bearing housing 37 mounted on plate 12 ensures a vacuum seal around shaft 36.

A plurality of ring gutters 38, 38 constructed of metal or other suitable material are mounted on riser rods 34, 34 and encircle core 11 at spaced intervals along the vertical extent of core 11, gutters 38, 38 being arranged for rotation by rods 34, 34. Flared annular skirts 39, 39 are welded to core 11 immediately above each of the ring gutters 38, 38 and direct condensate from core 11 into the gutters 38, 38. Each ring gutter 38 has a tube 40 welded or otherwise secured to the gutter and opening into the bottom of the gutter. Each tube 40 projects upwardly and outwardly from the gutter 38 to which it is connected to a point adjacent the inner surface of column 10 and substantially above the next higher ring gutter. Desirably, each tube 40 is of a length of approximately twice the distance between each pair of ring gutters.

In a preferred embodiment, each of the tubes 40, 40 is spaced 120° around the periphery of core 11 from the next lower tube. Desirably, the tube from the top ring gutter discharges directly into collecting gutter 17 around the lower margin of the total condenser zone 15 of column 10.

Mounted on each of the riser rods 34, 34 is a wiping device arranged to sweep over the heated portion of column 10. In the preferred embodiment the wiping device comprises a pair of arms 41, 41 pivoted on each rod 34, one arm being mounted adjacent the lower end of the riser rod and the other arm at a height opposite the upper margin of the heated portion of column 10. A flexible chain 42 or other suitable wiping device is secured to arms 41, 41 and is swung into sweeping contact with column 10 by rotation of rods 34, 34 about core 11.

In the preferred embodiment illustrated by the drawings, the core 11 comprises a short length of thick walled metal tubing 44 welded or otherwise secured to plate 12 and projecting part of the way down through the unheated total condenser zone of column 10, two concentric metal tubes 45 and 46 welded to the lower end of tubing 44 to form a double walled core proper extending throughout most of the length of column 10, a metal rod 47 welded to and closing the bottom of the inner concentric tube 45 and extending downwardly to the bottom of column 10, and a short length of metal tubing 48 projecting from the lower end of rod 47 and seating in drain 25. Tubing 48 which seats in drain 25 is provided with a wall opening 50 to permit flow of residue from the column 10 into drain 25. The inner concentric tube 45 of the core proper defines a central passage extending through most of the length of the core. The outer concentric tube 46 which preferably terminates above the lower end of the inner tube 45 defines an annular space around the core for circulation of cooling fluid. The annular space between concentric tubes 45 and 46 is sealed off from communication with either the central passage within tube 45 or the space within column 10. Cooling fluid is introduced into the lower end of the annular space through inlet tube 27 and withdrawn from the upper end of the annular space through outlet tube 28. The core 11 has a plurality of openings 51, 51 from the space within column 10 into the central passage within tube 45 for evacuating the space between core 11 and column 10 throughout the length of core 11 in order to minimize the pressure drop over the length of the column. In the preferred embodiment, all of the openings 51, 51 except the upper and lower openings, are immediately under the annular skirts 39, 39 on core 11. Thus, the skirts shield the openings against the entrance of vapors of the material being distilled. A deflector plate 52 mounted on riser rods 34, 34 just above gutter 17 serves to deflect vapors to the unheated upper portion 15 of column 10.

In operating the still embodying the invention, the evacuating port 19 is connected to a suitable vacuum pumping system, water inlet tube 27 is connected to a source of cooling water and the heating jacket is connected into an electrical circuit. The product withdrawal conduit 18 is connected to a suitable vacuum tight receiver and the distilland inlet 24 and residue drain 25 are connected to a reservoir for residue respectively. The still is then evacuated to the desired degree of vacuum, preferably below 100 microns Hg and more desirably to a pressure of 10 microns Hg or less.

Shaft 35 is rotated by means of a suitable motor which in turn causes the entire rotatable assembly mounted on ring gear 29, annular plate 32 and riser rods 34, 34 to revolve around core 11. Flexible chains 42, 42 are thrown outwardly towards the inner surface of column 10 and sweep laterally around the circumference of the column, and the ring gutters 38, 38 and condensate conveying tubes 40, 40 whirl around core 11.

With the heating jacket at the desired vaporizing temperature and the core cooled by circulating water, distilland is slowly fed into the column through inlet 24. The incoming distilland is immediately spread in a thin film on the inner surface of column 10 by the sweeping action of chains 42, 42. As the distilland flows down the column from the distilland inlet 24, at least a portion of the distilland is vaporized and a stream of vapors rises in the confined space between core 11 and column 10. The less volatile portion of the distilland which is unvaporized in passage down the column from the distilland inlet drains out the residue drain 25 to a suitable collecting reservoir from which it can be recycled to the still if desired. As the stream of distillate vapors passes upwardly between the heated column 10 and the cooled core 11, part of the vapors contact the cooled core and are condensed. The whirling tubes 40, 40 and riser rods 34, 34 help to induce turbulence in the vapor stream whereby streamlining of the vapors to any objectionable degree is obviated.

The condensate fraction condensed on the localized zone of core 11 above the lowest ring gutter and below the next higher ring gutter flows downwardly over the annular skirt at the lower margin of such localized zone and thence into the ring gutter at the lower end of the zone. This condensate fraction is then flung outwardly into the tube 40 connected with the ring gutter and is centrifugally conveyed upwardly and outwardly through the tube and is discharged onto the heated column 10 at a point substantially above the top of the zone from which the fraction was collected and preferably opposite the upper margin of the next higher collecting zone.

The condensate fraction discharged onto the heated column mixes with residue from the next higher zone and the mixture is immediately spread in a thin film by the sweeping action of chains 42, 42 and flows downwardly over the heated surface of column 10. The more volatile portions of the condensate fraction are immediately revaporized into the vapor stream at a point higher than the point on the core at which they were condensed, and hence are necessarily recondensed on core 11 at a higher zone on the core. The less volatile components of the condensate fraction flow downwardly along column 10 and are volatilized in the same zone as that in which they were originally condensed, where the cycle is repeated. The less volatile components thus act as a countercurrent reflux stream in the next higher localized zone of the still from the zone in which they are vaporized and by repeated condensation and revaporization are stripped completely of the more volatile components. Any phlegmatic components entrained in the original vapors gradualy work their way downwardly to the bottom of the still and flow out the residue drain.

The process of condensation of vapor fractions is repeated at each localized zone between a pair of ring gutters throughout the length of the core opposite the heated portion of the column. Each condensate fraction is advanced to a point on the vaporizing surface of column 10 higher than the point at which any part of the fraction was condensed. Thus, in any given localized zone of the column, the material being revaporized opposite a collecting zone on the condenser is a mixture of the residue from the next higher zone and the distillate from the next lower zone. This has been found to give greatly improved fractionating efficiency for a given length of column since each section of the still between a pair of ring gutters acts as an individual still with movement of material in both directions through the sections. The vapor stream is thus gradually enriched in volatile components and depleted in less volatile components as it passes upwardly through the still. The fractionation can be further enhanced by establishing a gradual temperature gradient over the length of the heated portion of column 10 if desired, since a gradual decrease in temperature upwardly through the column will cause a gradual lessening in the total amount of revaporization of the condensate fractions in any given zone.

The length of the still can be varied as desired and the number of condensing zones and ring gutters can be varied correspondingly. It has been found that a spacing of approximately two inches between ring gutters gives a high fractionating efficiency. The condensate fraction collected in the top ring gutter is desirably discharged directly into the product collecting gutter. In this way, the volume of vapors entering the unheated portion of column 10, which acts as a total condenser, is greatly diminished and air cooling of this section is sufficient for total condensing. The total condensation of vapors reaching the unheated upper zone of the column is further aided by use of a deflector plate 52 which deflects the vapor stream against the unheated column wall. This serves to minimize entrance of vapors into the evacuating port. The provision of a central passage through the length of the core with openings into the column proper aids in evacuation of the still and prevents excessive pressure drop over the length of the still. This is particularly advantageous with materials subject to thermal decomposition since the temperature required for initial vaporization can be maintained at a minimum.

The still operates effectively as a continuous distillation unit with distilland being progressively introduced through inlet 24 and residue withdrawn through drain 25. By closing drain 25, the still can be operated as a batchwise pot still if desired, particularly when prolonged heating of the distilland is not objectionable. The wiping device which can be a flexible chain or its equivalent prevents channeling in the still and permits rapid vaporization from a thin film of distilland. The action of the wiping device also serves to repeatedly renew the surface of the film of material being vaporized whereby more effective stripping is attained. The whirling gutters and tubes are effective for collecting condensate fractions and conveying such collected fractions to a zone higher than that from which they were collected without obstructing free passage of vapors from the heated column wall to the cooled core. By progressively raising the condensate fractions upwardly through the column, the fractionating power and the throughput of the still are both increased.

Although the invention has been described in considerable detail with particular reference to a preferred embodiment thereof as illustrated in the drawings, it will be understood that variations and modifications can be effected within the spirit and scope of the invention as illustrated in the accompanying drawings, as described hereinabove and as defined in the appended claims.

We claim:

1. High vacuum fractional distillation apparatus comprising in combination a stationary substantially vertical vaporizing member of generally tubular cross-section, a stationary generally tubular condensing member disposed within said vaporizing member in generally concentric relation therewith, said condensing member extending throughout a major portion of the length of said vaporizing member, said vaporizing member and said condensing member defining therebetween a confined generally unobstructed channel for the passage of vapors, means for evacuating said confined channel between said members, means for heating said vaporizing surface, means for cooling said condensing surface, a plurality of annular collecting troughs encircling said condensing member at spaced apart positions along said condensing member, each said trough being arranged for collecting a condensate fraction from a localized zone of said condensing surface immediately above said trough and extending to the next higher collecting trough, means on said condensing member arranged for channeling condensate from each said zone on said condensing member into the collecting trough at the lower end of the zone, tube means communicating with each said trough and arranged to convey condensate from each said trough to said vaporizing surface, each of said tube means extending from a trough upwardly to a height substantially above the next higher collecting trough, and means for rotating said collecting troughs and tube means to centrifugally discharge condensate from said troughs through said tube means onto said vaporizing surface at a zone on said vaporizing surface substantially higher than the zone on said condensing surface from which the condensate was collected.

2. High vacuum fractional distillation apparatus as set forth in claim 1 in which the means on the condensing member arranged for channeling condensate from each zone on the condensing member into the collecting trough at the lower end of each zone is an annular skirt.

3. High vacuum fractional distillation apparatus comprising in combination a vertically disposed generally tubular outer member, a stationary and generally tubular inner member substantially coextensive with said outer member and generally concentric therewith, said members defining therebetween a confined generally unobstructed channel for the passage of vapors of the material being fractionated, an upper portion of said outer member forming a total condenser, means for heating substantially the extent of said outer member below said upper portion to vaporizing temperature, means for cooling said inner member, means for introducing material to be distilled onto a heated lower portion of said outer member, means for evacuating the channel between said inner member and said outer member, said inner member having a central passage extending substantially the length of said inner member and a plurality of ports connecting said central passage and said confined channel, a plurality of collecting troughs encircling said inner member at a plurality of spaced-apart positions along said inner member, said collecting troughs being mounted for rotation about said inner member, means mounted on said inner member for conducting condensate fractions into said collecting troughs, each said trough being arranged to collect a condensate fraction from a localized zone on said inner member extending from said trough to the next higher trough, a plurality of tubes arranged for conveying condensate fractions from said collecting trough to the inner surface of said outer member, each of said collecting troughs having one of said tubes communicating with said trough and mounted for rotation with said trough, each said tube extending upwardly from the trough to which said tube is connected a distance substantially equal to two of the localized collecting zones on said inner member, means for rotating said troughs and said tubes, means arranged for spreading condensate on the heated portion of said outer member, and means for moving said spreading means laterally along the inner surface of said outer member.

References Cited in the file of this patent

UNITED STATES PATENTS

| | | |
|---|---|---|
| 2,539,699 | Perry | Jan. 30, 1951 |
| 2,578,086 | Perry | Dec. 11, 1951 |
| 2,606,146 | Luten | Aug. 5, 1952 |
| 2,609,335 | Hickman | Sept. 2, 1952 |
| 2,614,973 | Burrows | Oct. 21, 1952 |

FOREIGN PATENTS

| | | |
|---|---|---|
| 524,439 | Great Britain | Aug. 6, 1940 |
| 614,388 | Great Britain | Dec. 15, 1948 |